United States Patent [19]

Spangler

[11] 4,186,849
[45] Feb. 5, 1980

[54] CONTROL CIRCUIT FOR AUTOMATICALLY MONITORING, DISPENSING, AND FILLING A LIQUID IN A CONTAINER

[76] Inventor: Searle T. Spangler, 2 Forian Ct., Westport, Conn. 06880

[21] Appl. No.: 893,484

[22] Filed: Apr. 4, 1978

[51] Int. Cl.² .................... B67D 5/08; B67D 5/32; G08B 21/00
[52] U.S. Cl. ........................ 222/25; 222/39; 222/56; 222/66; 340/620; 361/178; 137/392
[58] Field of Search .......... 222/25, 39, 23, 56, 222/64, 66, 76; 141/198, 95; 137/101.25, 391, 392, 558; 340/620, 618, 612, 603, 329, 371; 200/61.2, 61.05; 307/118; 361/178; 116/109, 227, DIG. 7

[56] References Cited

U.S. PATENT DOCUMENTS

| | | | |
|---|---|---|---|
| 2,502,578 | 4/1950 | McDaniel | 361/178 X |
| 3,300,690 | 1/1967 | Taraba | 361/178 |
| 3,437,108 | 4/1969 | Sorensen | 137/392 |
| 3,580,158 | 5/1971 | Scholle et al. | 137/392 X |

*Primary Examiner*—Robert J. Spar
*Assistant Examiner*—Edward M. Wacyra
*Attorney, Agent, or Firm*—Joseph Levinson

[57] ABSTRACT

An automatic control circuit is provided for diluting a chemical concentrate in a container by the proper proportion, dispensing the mixture, indicating that the container is empty, and repeating the process. The container has a plurality of conductive probes which extend to different depths within the container. A pair of relays having contacts which control drain and fill solenoid valves in the container are controlled by the probes, depending on the level of the liquid in the container. Both visual and audible alarms are provided to indicate when the tank is empty and needs concentrate to be added thereto.

7 Claims, 1 Drawing Figure

U.S. Patent      Feb. 5, 1980      4,186,849
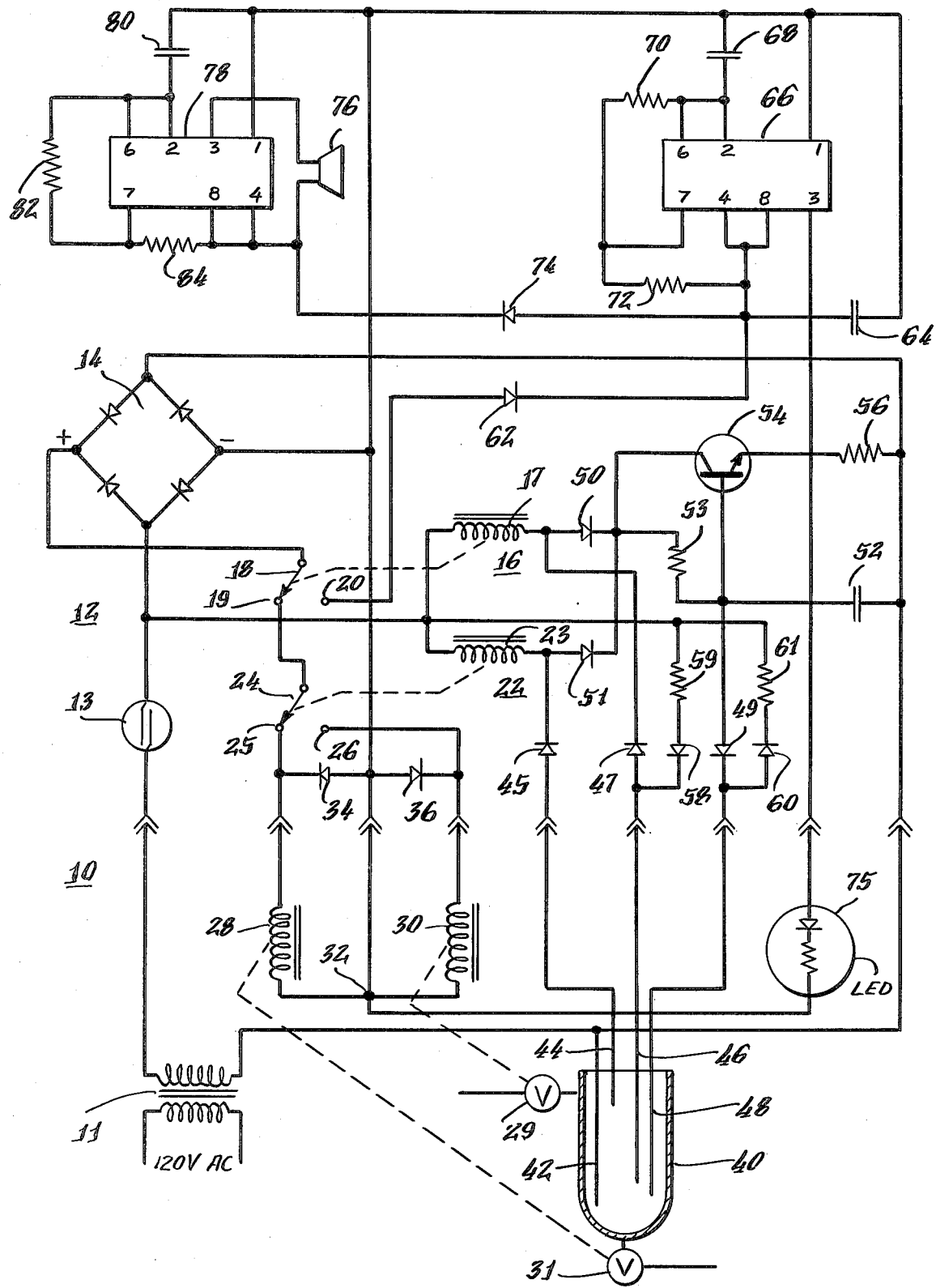

CONTROL CIRCUIT FOR AUTOMATICALLY MONITORING, DISPENSING, AND FILLING A LIQUID IN A CONTAINER

BACKGROUND OF THE INVENTION

This invention relates to a control circuit for automatically monitoring, dispensing, and filling a liquid in a container which is particularly useful in the field of photography.

In processing films in photographic work, chemicals are required and are available in a premixed condition. However, when the usage is great, for example in commercial work, a concentrate is normally used which requires accurate mixing with water. In such systems, a concentrate of the developer or fixer is placed in a container, and then a measured amount of water is added. The mixed developer and fixer in such commercial systems are drained from the bottom of the tank, and the user is usually not aware that he has used up most of the mix until nothing is left in the tank. When the tank or container is empty, the user must add concentrate and measure out the proper amount of dilutant. This process is time consuming, and subject to inaccuracies in mixing, which is a function of the care which the user takes in doing the measuring and filling.

Accordingly, it is an object of this invention to provide a new and novel control system for automatically monitoring, dispensing, and filling a liquid in a container which is accurate, reliable, saves time, and eliminates human error.

SUMMARY OF THE INVENTION

In carrying out this invention in one illustrative embodiment thereof, a container is provided for holding and diluting a concentrate, and dispensing the mixture therefrom. A plurality of separated, electrically conductive probes extend to different depths within the container, which are coupled to and control the contacts of a pair of relays. The contacts of the relays are coupled to and control drain and fill solenoid valves in the container. The switching of the contacts of the relay is controlled by the level of the liquid in the container, and sensed by the electrically conductive probes to activate the drain or fill valves. Audible and visual alarm means may be provided for indicating that a container needs to have concentrate added thereto.

BRIEF DESCRIPTION OF THE DRAWINGS

The drawing is a schematic diagram of an illustrative embodiment of the control circuit embodied in this invention.

DESCRIPTION OF THE PREFERRED EMBODIMENTS

Referring now to the drawing, the control circuit and system for automatically monitoring, dispensing, and filling a liquid in a container is broken up physically into two separate portions, designated generally with the reference characters 10 and 12. The portion 10 represents mainly the hardware, while the portion 12 represents the electrical control circuitry for controlling the portion 10. The sections 10 and 12 are interconnected electrically as shown in the drawing.

Portion 10 of the system includes a mixing tank 40 which is large enough to accomodate the chemical concentrate and its dilutant, such as water, in the amount required. For example, if a gallon of concentrate is to be diluted by adding four gallons of water thereto, tank 40 would of necessity have a minimum capacity of over five gallons. The tank 40 is equipped with a plurality of stainless steel probes 42, 44, 46 and 48, which are of different lengths and extend to different depths within the container or tank 40, and are used for performing control functions which will be explained hereinafter. The probes are electrically conductive, and probe 42 is a common probe which is connected to one side of the A.C. power.

The container or tank 40 is utilized to mix concentrate with the proper amount of dilutant, and to dispense the mixture automatically as needed. In the mixing function, the user places the proper amount of concentrate which is to be diluted in the tank 40, and in accordance with the present invention, the control circuit is actuated, which automatically fills the tank with the proper amount of dilutant. The contents of the tank 40 are then utilized or dispensed as needed until the tank becomes empty, when again the user must add concentrate. Dispensing and filling functions are controlled by a pair of solenoids 28 and 30. Drain solenoid 28 controls drain valve 31 for dispensing liquid from the container 40, while the fill solenoid 30 controls a fill valve 29 for adding dilutant such as water to the tank. The hardware portion 10 of the system also includes a light emitting diode 75 which provides a visual indication of when the container or tank 40 is empty, as will be explained hereinafter. Power for the system is provided from 120 v. A.C. line which is stepped down by transformer 11 to, for example, 12 v. A.C. for safety and operating convenience.

Power is applied to the circuit portion 12 of the system from the secondary of transformer 11 to opposite sides of a bridge rectifier 14 for providing full-wave rectification. This 12-volt A.C. is also applied to one side of the coils 17 and 23 of the polarized relays 16 and 22 respectively. The relay 16 controls a switch 18 which has a pair of contacts 19 and 20, while the relay 22 controls a switch 24 having a pair of contacts 25 and 26. Coils 17 and 23 are coupled by diodes 50 and 51, respectively, to the collector of a transistor 54. Transistor 54 has a resistor 53 coupled between the base and the collector thereof, a resistor 56 coupled between the emitter and one side of the A.C. power, and a capacitor 52 coupled between the base of transistor 54 and one side of the A.C. power. Probe 44 is coupled through a diode 45 to one side of relay coil 23, while probe 46 is coupled through a diode 47 to one side of relay coil 17. A resistor 59 and diode 58 are connected in series to the other side of relay coil 17 and probe 46 for preventing electrolysis in tank, as will be described in the operation of the device. Probe 48 is coupled through a diode 49 to the base of transistor 54, and to the other side of the A.C. power by a diode 60 in series with resistor 61, also for preventing electrolysis in the tank 40.

The purpose of the bridge rectifier 14 is to provide power, for example 12 v. D.C., to operate the drain and fill solenoids 28 and 30, respectively. However, it will be apparent to those skilled in the art that the solenoids may be A.C. actuated. The positive D.C. of the bridge rectifier 14 is applied through switch 18 and contact 19 through switch 24, contacts 25 and 26, to either the drain solenoid 28 or the fill solenoid 30, respectively. The negative side of the bridge rectifier 14 is connected to point 32 which has the other side of the drain and fill solenoids 28 and 30, respectively, connected thereto.

Thus, with the switch 18 of relay 16 on contact 19, and the switch 24 of relay 22 positioned on contact 25, D.C. power is applied across the drain solenoid 28 to activate the valve 31 to thus dispense liquid from the tank 40. With the relay 16 continuing to have contact 19 closed by switch 18, and the relay 22 having the switch 24 closing contact 26, D.C. power is applied to the fill solenoid 30 for operating the fill valve 29, while at the same time the drain solenoid is inactivated and in a closed position. Opposed diodes 34 and 36 are connected across drain solenoid 28 and fill solenoid 30 for eliminating switching transients and prolonging the life of the relay switches 18 and 24.

An alarm or warning system is provided to indicate when the tank 40 is empty, at which time the switch 18 of relay 16 is connected to contact 20. A diode 62 is coupled to a capacitor 64 and a timer integrated circuit 66. The integrated circuit 66 may be of any suitable type, for example a 555 IC. A capacitor 68 and resistors 70 and 72 provide the time constant for the timer integrated circuit 66. A diode 74 couples the capacitor 64 to a noise-maker 76 which also has coupled thereto a timer integrated circuit 78. A capacitor 80 and resistors 82 and 84 provide the time constant for the timer integrated circuit 78, which may also be of any suitable type, such as a 555 IC.

In operation, when contact 20 of relay 16 is closed by the switch 18, which is indicative of the fact that the tank 40 is empty, power from the bridge rectifier 14 is applied to the alarm system through diode 62, which charges capacitor 64 to remove the ripples from the full-wave rectified output of the bridge rectifier 14 to provide hard D.C. This power operates timer 66 which is connected to the light-emitting diode 75. If the system is operated in a dark room, which would be the case when using the system in photography, the timer circuit 66 operates to flash the light-emitting diode 75 on and off in a fashion, and the light emitting diode having a wavelength designed to avoid the fogging of any film under development. The timer integrated circuit 66 may be operated in an astable mode to flash the LED 75 a half second off and a half second on to direct attention to the fact that the tank 40 requires recharging with chemical concentrate and dilutant. The same hard D.C. from capacitor 64 is coupled through the diode 74 to another timer integrated circuit 78 which operates a noise maker 76. This circuit may be operated such that the noise maker 76 is on one second and off four seconds, although any timer mode may be utilized, and if not desired, the noise maker or transducer 76 can be continually actuated. The same holds true for the light-emitting diode 75, which may be burned steadily if flashing is not desired.

In describing the operation of the control circuit of the present invention, as a starting point, it is assumed that the switches 18 and 24 of relays 16 and 22, respectively, are in the position shown in the drawing. In such a position, D.C. power from the bridge rectifier 14 is applied through switch 18, contact 19, switch 24, and contact 25 to one side of the drain solenoid 28 and to the other side from contact point 32 which is common to both drain and fill solenoids 28 and 30, respectively. Accordingly, the drain valve 31 is actuated by the drain solenoid, allowing the liquid mixture in the tank 40 to be utilized as needed. During this draining cycle of the tank, the transistor 54 is off, and current through the relay coils 17 and 23 of relays 16 and 22, respectively, which is directed through resistor 53, is shorted out through diode 49 and probes 48 and 42 through the liquid in the tank to one side of the A.C. power. Relay 16 is thus energized in a negative direction through probes 42 and 46, whose circuit is closed through the liquid in the tank 40, while the coil 23 of relay 22 is de-energized, leaving its associated switch 24 connected to contact 25 which operates the drain solenoid 28 when power is provided. As the mixture is used, and the level of liquid falls within the container or tank 40 below the level of the probe 46, nothing happens, since the probe 46 serves to turn the relay 16 on but not off. However, when the level of the liquid falls below probe 48, transistor 54 is turned on because the short circuit through diode 49 and probes 48 and 42 is broken. Accordingly, positive half-cycles of the A.C. power provide a current through relay coils 17 and 23, and through resistor 51, making the base of transistor 54 positive, which turns the transistor 54 on and allows the current of the coils 17 and 23 to pass through the transistor 54 and the resistor 56 to the negative side of the A.C. power. This actuates the relay 16 and causes its switch 18 to move to contact 20, which couples the output of the bridge rectifier 14 through the diode 62 to the alarm circuits. At the same time, the turning on of the transistor 54 closes a path to coil 23 of relay 22 for actuating the switch 24 and moving it to contact 26, which in effect readies the system for the fill mode when relay 16 is later reversed. Accordingly, when the tank is empty, switch 18 of relay 16 closes contact 20, and switch 24 of relay 22 closes contact 26.

In the above empty condition, the alarm indicates that chemical concentrate must be added to the tank. On the adding of chemical concentrate to the tank 40, electrical contact through the added liquid is provided between probes 42, 46 and 48. The contact between common probe 42 and probe 48 provides a path for current in the base circuit of the transistor 54 through diode 49 so that the base of transistor 54 is connected to A.C. ground, and the transistor 54 is turned off. The conduction path provided by the concentrate between probe 46 and common probe 42 provides current of opposite polarity to that which had previously been provided through the coil 17 of relay 16 through transistor 54, thereby actuating the relay and changing switch 18 from contact 20 to contact 19. This reversal of polarity is provided through common probe 42, the liquid in the tank, probe 46, and diode 47. Since relay 22 has its contact 26 closed, fill solenoid 30 is actuated by the power applied thereto from the bridge rectifier 14 to turn on the valve 29, which allows water to start filling the tank. Since there is likelihood of electrolysis occurring within the tank by putting a current through the fluid in one direction only, the diode 58 and series resistor 59 are connected to the opposite side of the A.C. power to provide a cancelling current to that operating relay 16, thereby preventing electrolysis. As the water continues to dilute and mix with the concentrate in the tank 40, and the mixture therein reaches the point where probe 44 is contacted, current is directed between common probe 42 and probe 44 through diode 45 through the coil 23 of relay 22. This activates the relay and moves the switch 24 from contact 26 to contact 25 to operate the drain solenoid 28, and in effect to turn off the fill solenoid 30. Accordingly, normal operation and the use of the chemical mixture takes place as before. The mixture is then used up until its level again falls below probe 48, when the cycle begins again. It should be mentioned that since probe 48, which serves to keep the transistor 54 off when there is no contact with the liquid, is also subject to electrolysis, diode 60 and series connected resistor 61 are used to cancel any electrolysis on that probe. No such diode or resistor is required for probe 44, since that probe has no sustained contact or current, but rather simply performs a switching function for switching between the fill and drain solenoids, with the draining of the liquid taking place immediately once the contact with the probe 44 is made and then, immediately, the first draining of fluid will cause the contact to be broken.

It will be readily apparent that several tanks may be operated in tandem, and in fact the circuit will usually be built in pairs for photographic work, in view of the use of developer and fixer chemicals. In such a case, the combining of two circuits will allow the elimination of duplication of the noise-maker and power supply. A single noise-maker may be utilized for indicating an empty tank, while the individualized LED's, one for each tank used, could identify the tank which is empty. Likewise, if D.C. power is required to operate the drain and fill solenoids, a single D.C. power supply could be used to operate the solenoids for a plurality of installations. As previously pointed out, the full wave rectified D.C. provided by the bridge rectifier circuit would not be needed if the fill and drain solenoids were of the A.C. operating type. Also, the timer circuits in the alarm may be dispensed with if steady operation is desired or can be tolerated.

It should be pointed out that the drain solenoid 28 and its associated valve 31 may be replaced by a manual drain valve if the user so desires. The circuit would operate the same except that contact 25 of relay 24 would not be connected to a drain solenoid, and accordingly when the switch 24 closed contact 25, draining would take place only by some manual operation by the user. If manual draining is used, care must be taken to provide that the container 40 will not be drained at the same time filling is taking place, to insure that a proper mixture of concentrate and dilutant is obtained.

A circuit has thus been provided for automatically monitoring, dispensing and filling a liquid in a container which requires minimal operation by the user. The system applies to those uses where a concentrate is first added to a container and then automatically diluted by a precise amount which requires no guesswork by the user. The system provides an alarm when a tank is empty. All the user need do is to insert the concentrate into the tank, turn on the power, and the system precisely adds the amount of dilutant desired and dispenses it as required under the control of the user.

Since other modifications and changes, varied to fit particular operating requirements and environments, will be apparent to those skilled in the art, this invention is not considered limited to the examples chosen for purposes of illustration, and covers all modifications and changes which do not constitute departures from the true spirit and scope of this invention.

What I claim is:

1. A control circuit for automatically monitoring, dispensing and filling a liquid in a container of the type in which a concentrate is first added to the container and then automatically diluted under the control of said control circuit, comprising in combination
   (a) a container for holding and dispensing liquid therefrom having a plurality of separated electrically conductive probes of different lengths extending to different depths within said container,
   (b) a drain solenoid valve coupled to said container for dispensing liquid from said container when said drain solenoid valve is activated,
   (c) a fill solenoid valve coupled to said container for adding liquid to said container when said fill solenoid valve is activated,
   (d) a first relay having first and second contacts, said first contact when closed adapted to apply power to said solenoid valves,
   (e) a second relay having first and second contacts coupled to said first contact of said first relay for activating said drain solenoid valve or said fill solenoid valve when said first or second contacts of said second relay, respectively, are closed,
   (f) switch means coupled to said first and second relays, and
   (g) means for coupling at least one of said electrically conductive probes to each of said first and second relays and said switch means for controlling said relays and said switch means in accordance with the amount of liquid in said container.

2. The control circuit set forth in claim 1 wherein the longest probe in said container is a common probe co-operating with at least one other of said plurality of probes in said container to provide a conductive current path through said liquid depending on the level of the liquid in said container for controlling the operation of said first and second relays.

3. The control circuit set forth in claim 1 or claim 2 having an alarm circuit coupled to said second contact of said first relay which is activated when said container is empty.

4. The control circuit set forth in claim 2 wherein said next longest probe of said plurality of probes is coupled to said switch means for activating said switch means when said container is empty.

5. The control circuit set forth in claims 2 or 4 wherein the shortest probe of said plurality of probes is coupled to said second relay for opening the second and closing the first contacts of said second relay when the liquid level in said container reaches said shortest probe, thereby opening the drain solenoid valve and closing the fill solenoid valve.

6. The control circuit set forth in claim 1 having a visual alarm device coupled to said second contact of said first relay which is activated when said container is empty thereby providing an indication of the empty condition of said container.

7. The control circuit set forth in claim 6 having a noisemaker coupled to said second contact of said first relay which is activated when said container is empty thereby providing an audible indication of the empty condition of said container.

* * * * *